Figure 1:
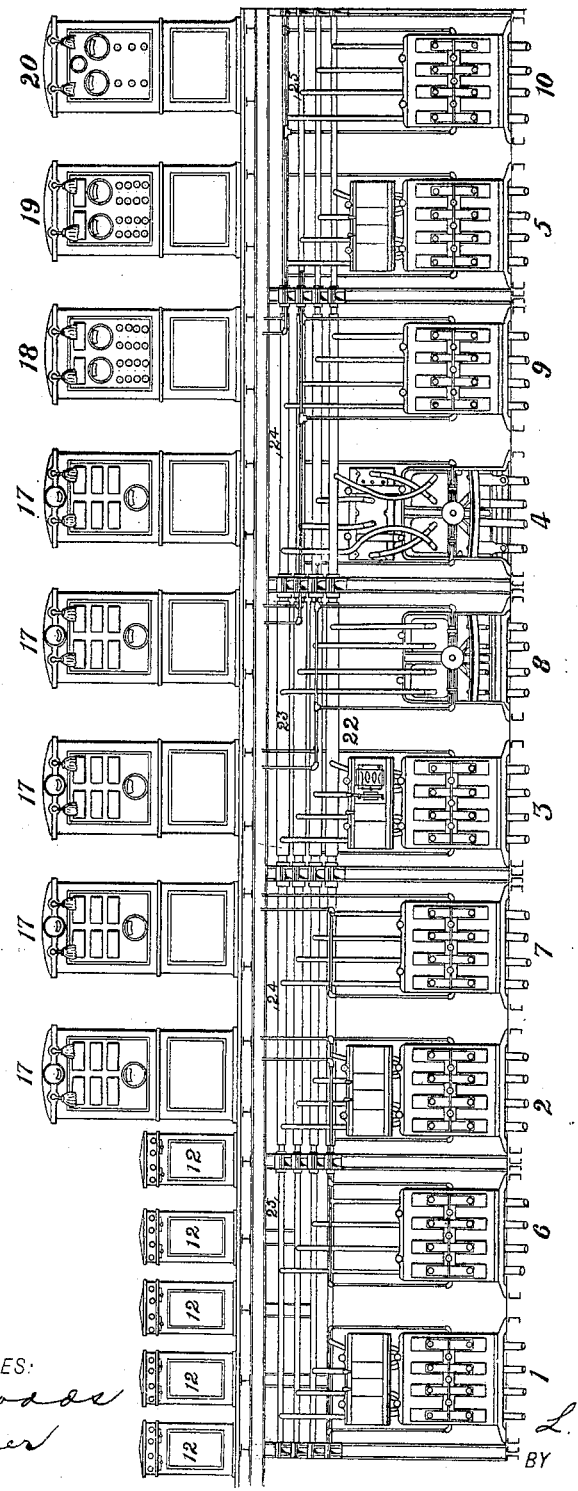

(No Model.) 2 Sheets—Sheet 1.
L. B. STILLWELL.
SWITCHBOARD FOR ELECTRICAL DISTRIBUTION SYSTEMS.
No. 565,811. Patented Aug. 11, 1896.

WITNESSES:
INVENTOR
L. B. Stillwell
BY
Terry, MacKaye & Carr
ATTORNEYS.

(No Model.) 2 Sheets—Sheet 2.
L. B. STILLWELL.
SWITCHBOARD FOR ELECTRICAL DISTRIBUTION SYSTEMS.
No. 565,811. Patented Aug. 11, 1896.
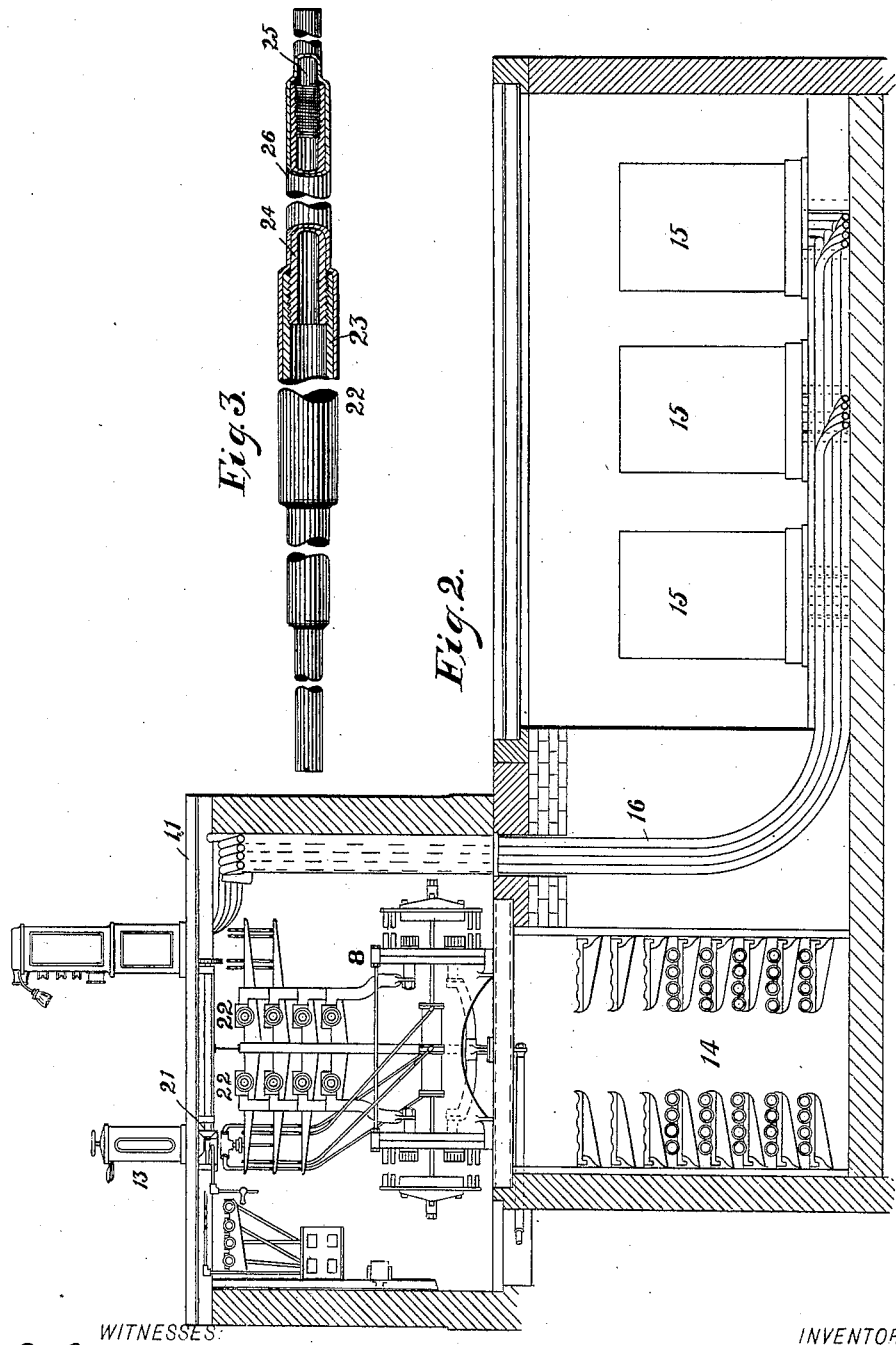

UNITED STATES PATENT OFFICE.

LEWIS B. STILLWELL, OF PITTSBURG, PENNSYLVANIA, ASSIGNOR TO THE WESTINGHOUSE ELECTRIC AND MANUFACTURING COMPANY, OF SAME PLACE.

SWITCHBOARD FOR ELECTRICAL DISTRIBUTION SYSTEMS.

SPECIFICATION forming part of Letters Patent No. 565,811, dated August 11, 1896.

Application filed August 6, 1895. Serial No. 558,357. (No model.)

*To all whom it may concern:*

Be it known that I, LEWIS B. STILLWELL, a citizen of the United States, residing in Pittsburg, in the county of Allegheny and State of Pennsylvania, have invented a new and useful Improvement in Switchboards for Electrical Distribution Systems, (Case No. 657,) of which the following is a specification.

My invention relates to switchboards for systems of electrical distribution, and has particular reference to apparatus of this character which is to be used in connection with the generation and distribution of alternating currents of high tension.

My invention has for its object to provide a switchboard for high-potential systems of distribution in which the several parts shall be compactly and advantageously arranged, and which shall be as simple in construction as is consistent with efficiency and durability.

A further object of the invention is to provide bus-bars of peculiar construction which are adapted to afford a maximum degree of conductivity with a minimum amount of copper, which may be easily and effectively insulated, and which shall present a maximum amount of heat-radiating surface.

With these ends in view I have devised the apparatus shown in the drawings and herein described.

Referring to the drawings, Figure 1 is a front elevation of the switchboard, parts being broken away and two of the switches being shown in section. Fig. 2 is a vertical sectional view taken at right angles to the view of Fig. 1 between switches 4 and 8; and Fig. 3 is a detail view, partially in side elevation and partially in section, of one of the bus-bars, portions of the same being broken away.

Referring to the drawings in detail, 1, 2, 3, 4, and 5 are feeder-switches, and 6, 7, 8, 9, and 10 are dynamo-switches, these being alternately arranged, in order that the losses in the bus-bars may be small as compared with the losses incident to the usual arrangement, in which the feeder-switches are at one end and dynamo-switches at the other. Each of these switches is double, that is to say, it consists of two parts which are duplicates of each other, and which may be independently operated, as is clearly indicated in Fig. 2. These switches are actuated by means of pneumatic pressure, as indicated in the said figure, and in order to control the air-pressure, and thus open and close the switches as may be desired in practice, I provide upon a platform 11, which extends above the compartment in which the switches are located, two series of controller-stands 12 and 13, provided with shafts and handles for actuating the valves, the handles only being shown in the drawings.

Suitably supported in a compartment directly beneath that in which the feeder and dynamo switches are located are the feeding-conductors 14, and in another compartment, at the rear of the one containing the feeding-conductors, are located resistance-boxes 15, the conductors 16 from which extend upward to the instrument-stands 17, there being one of these stands for each of the alternating-current dynamos and dynamo-switches. These stands are intended to contain the alternating-current ammeters, voltmeters, and wattmeters for each phase of alternating current and a direct-current ammeter, these being in the upper portion of the stand, as indicated. In the lower portion is located a switch (not shown) for cutting in and out the resistance 15.

In Fig. 1 are also shown three instrument-stands 18, 19, and 20, the stands 18 and 19 being intended to support the measuring instruments used in connection with rotary transformers and the stand 20 those used in connection with a direct-current generator, the said transformers and generators being employed as exciters for the alternators controlled by the switches 6 to 10.

In front of each of the instrument-stands 17 is mounted a controlling-stand 13, one of which is shown in Fig. 2. These are provided, in addition to the means for controlling the pneumatic pressure for actuating the switches, with a shaft and gearing 21 for moving the resistance-switch in the bottom of the instrument-stand, as indicated in Fig. 2.

22 are the bus-bars, each of which is shown in Figs. 1 and 3 as having a middle length or section 23 of large size, and two adjacent sections 24 of smaller size, and two end sections 25 of still smaller diameter. Particular reference being had to Fig. 3, it will be seen that the middle length or section 23 consists of a tube internally screw-threaded at its ends, that the next adjacent sections 24 are also lengths of tubing having exterior screw-threads which engage with the internal screw-threads on the middle portion, and that the extreme outer lengths or sections 25 are in the form of cylindrical bars or rods which are in screw-threaded engagement with the ends of the adjacent tubular sections, the entire bus-bar thus constructed being covered with suitable insulation 26. The bus-bar sections may be connected together otherwise than as shown, as will be readily understood. Hence I do not desire to limit myself to any specific means for making such connection. Bus-bars constructed in this manner are particularly advantageous for use in connection with the distribution of high-tension alternating currents for the following reasons:

It is often desirable, especially where high potentials are employed, to thoroughly insulate bus-bars. This can most conveniently be accomplished by employing conductors of rounded surface, but where solid rods or bars of any considerable size are used the inner portion is comparatively inactive, the greater portion of the current being conducted by the metal at or near the surface. It is apparent from this that a solid conductor is not economical, since there is such a very considerable portion of the metal that is comparatively useless. It is also found that the heat generated by the passage of the current through the conductor is much more quickly and readily dissipated for the reason that a conductor of this form has a maximum amount of radiating-surface for the amount of metal employed.

Insulation may be readily and cheaply applied to the form of conductors which I employ, and is less liable to become ruptured than would be the case if the conductor had any other form of cross-section.

I claim as my invention—

1. The combination with two sets of cylindrical bus-bars, each of which comprises a plurality of sections differing in size and joined end to end, of a series of feeder-switches and a series of dynamo-switches connected alternately to said bus-bars and means for actuating said switches.

2. The combination with a plurality of bus-bars each of which comprises tubular sections joined end to end, of a series of feeder-switches and a series of dynamo-switches connected alternately to said bus-bars, and means for actuating said switches.

3. The combination with a series of feeder-switches and a series of dynamo-switches alternately arranged, of means for independently actuating said switches and a plurality of cylindrical bus-bars to which said switches are connected.

4. In a system of electrical distribution, the combination with a series of feeder-switches and a series of dynamo-switches alternately arranged, of controller-stands and connections whereby said switches are operated by pneumatic pressure, substantially as described.

5. The combination with two sets of cylindrical bus-bars, each bar having a middle tubular section, two adjacent tubular sections of smaller size and two cylindrical-bar end sections, of a series of double feeder and dynamo switches connected alternately with said bus-bars and means for actuating said switches pneumatically, substantially as described.

6. An electrical switchboard comprising a series of dynamo-resistances, a series of feeding-conductors, cylindrical bus-bars, and a series of dynamo and feeder switches located above said resistances, said feeder and dynamo switches being alternately arranged, and a series of instrument and controller stands located above said switches, substantially as described.

In testimony whereof I have hereunto subscribed my name this 5th day of August, A. D. 1895.

LEWIS B. STILLWELL.

Witnesses:
 A. SAUNDERS MORRIS,
 CHARLES IRA YOUNG.